United States Patent
Kunugise et al.

(10) Patent No.: US 10,437,016 B2
(45) Date of Patent: Oct. 8, 2019

(54) IMAGING LENS AND IMAGING APPARATUS

(71) Applicant: FUJIFILM Corporation, Tokyo (JP)

(72) Inventors: Takashi Kunugise, Saitama (JP); Kazuyoshi Okada, Saitama (JP); Michio Cho, Saitama (JP)

(73) Assignee: FUJIFILM Corporation, Tokyo (JP)

(*) Notice: Subject to any disclaimer, the term of this patent is extended or adjusted under 35 U.S.C. 154(b) by 500 days.

(21) Appl. No.: 15/412,077

(22) Filed: Jan. 23, 2017

(65) Prior Publication Data

US 2017/0242221 A1    Aug. 24, 2017

(30) Foreign Application Priority Data

Feb. 19, 2016 (JP) ................. 2016-029600

(51) Int. Cl.
| | | |
|---|---|---|
| *G02B 13/00* | (2006.01) | |
| *G02B 7/04* | (2006.01) | |
| *G02B 9/64* | (2006.01) | |
| *G02B 13/04* | (2006.01) | |

(52) U.S. Cl.
CPC ........... *G02B 13/0045* (2013.01); *G02B 7/04* (2013.01); *G02B 9/64* (2013.01); *G02B 13/04* (2013.01)

(58) Field of Classification Search
CPC ...... G02B 13/0045; G02B 9/64; G02B 13/18; G02B 27/0025; G02B 13/04; G02B 3/04; G02B 13/16; G02B 13/02; G02B 13/002; G02B 13/22; G02B 13/006; G02B 17/08; G02B 5/005; G02B 9/60; G02B 13/0015; G02B 13/004; G02B 9/62; G02B 13/06; G02B 3/02; G02B 13/0065
See application file for complete search history.

(56) References Cited

U.S. PATENT DOCUMENTS

| | | | |
|---|---|---|---|
| 2014/0078598 A1* | 3/2014 | Akiyama | G02B 15/173 359/687 |
| 2015/0168698 A1* | 6/2015 | Asami | G02B 15/161 359/684 |
| 2016/0097919 A1* | 4/2016 | Su | G02B 15/177 359/680 |
| 2017/0242222 A1* | 8/2017 | Aoi | G02B 7/04 |

FOREIGN PATENT DOCUMENTS

| | | |
|---|---|---|
| JP | 2013-148823 A | 8/2013 |
| JP | 2015-036779 A | 2/2015 |

* cited by examiner

*Primary Examiner* — Evan P Dzierzynski
*Assistant Examiner* — Sharrief I Broome
(74) *Attorney, Agent, or Firm* — Studebaker & Brackett PC

(57) ABSTRACT

The imaging lens includes, in order from the object side, a first lens group that remains stationary during focusing; a diaphragm; and a positive second lens group that moves to the object side during focusing from a long range to a close range. The first lens group includes, in order from the object side: a negative meniscus lens that has an absolute value of a radius of curvature of an image side surface smaller than that of an object side surface, a negative lens, a positive lens, and a negative lens. The second lens group includes five or less lenses, and includes: a positive Z lens that is formed continuously in order from a most image side; a negative Y lens that has an absolute value of a radius of curvature of an object side surface smaller than that of an image side surface; and a positive X lens.

20 Claims, 7 Drawing Sheets

EXAMPLE 1

EXAMPLE 1

EXAMPLE 2

EXAMPLE 3

EXAMPLE 4

IMAGING LENS AND IMAGING APPARATUS

CROSS-REFERENCE TO RELATED APPLICATIONS

The present application claims priority under 35 U.S.C. § 119 to Japanese Patent Application No. 2016-029600, filed Feb. 19, 2016, all of which are hereby expressly incorporated by reference into the present application.

BACKGROUND OF THE INVENTION

1. Field of the Invention

The present invention relates to an imaging lens and an imaging apparatus. In particular, the present invention relates to an imaging lens, which is appropriate for a factory automation (FA) camera, a machine vision camera, a surveillance camera, a digital camera, a cinema camera, and/or the like, and an imaging apparatus comprising the imaging lens.

2. Description of the Related Art

As imaging lenses, for example, lens systems described in the following JP2015-36779A and JP2013-148823A have been known. JP2015-36779A discloses a lens system including, in order from the object side: a first lens group that has a negative refractive power; a second lens group that has a positive refractive power; an aperture diaphragm; and a third lens group that has a positive refractive power, where the second lens group and the aperture diaphragm move, or elements ranging from the second lens group to the third lens group move, during focusing. JP2013-148823A discloses a zoom lens including, in order from the object side: a first lens group that has a negative refractive power; an aperture diaphragm; and a second lens group that has a positive refractive power, where the first lens group moves during focusing.

SUMMARY OF THE INVENTION

Recently, machine vision cameras, which capture an image of an object through an imaging lens and automatically perform detection and the like, have come into widespread use. Since there are various shapes of an object as an imaging target and various distances from the imaging lens to the object, accuracy is necessary for detection. Hence, it is preferable that the used imaging lens has a focusing function and has small fluctuation in aberrations caused by focusing, particularly, fluctuation in spherical aberration and astigmatism. For the imaging lens used in the camera of the above-mentioned field such as the machine vision camera, a high resolution is necessary. Therefore, it is preferable that lateral chromatic aberration thereof is small. In terms of reduction in size and costs, it is preferable that the number of constituent lenses is small.

The present invention has been made in consideration of the above-mentioned situation, and its object is to provide an imaging lens that has a small number of lenses, has small fluctuation in aberrations caused by focusing, has small lateral chromatic aberration, and has a favorable optical performance, and an imaging apparatus having the imaging lens.

Provided is an imaging lens of the present invention consisting of, in order from an object side: a first lens group that remains stationary with respect to an image plane during focusing; a diaphragm; and a second lens group that moves from an image side to the object side during focusing from a long distance object to a close-range object and has a positive refractive power as a whole. The first lens group consists of, in order from the object side, a negative meniscus lens that has an absolute value of a radius of curvature of an image side surface smaller than an absolute value of a radius of curvature of an object side surface, a negative lens, a positive lens, and a negative lens. The second lens group consists of five or less lenses. The second lens group includes a Z lens that is a positive lens formed continuously in order from a most image side, a Y lens that is a negative lens having an absolute value of a radius of curvature of an object side surface smaller than an absolute value of a radius of curvature of an image side surface, an X lens that is a positive lens. The following conditional expressions (1) and (2) are satisfied.

$$15 < v1 < 35 \quad (1)$$

$$-15 < v1 - vY < 10 \quad (2)$$

Here, $v1$ is an Abbe number of the negative meniscus lens of the first lens group based on a d-line, and
$vY$ is an Abbe number of the Y lens based on a d-line.

In the imaging lens of the present invention, it is preferable that among partial dispersion ratios of the lenses of the first lens group at a g-line and an F-line, a partial dispersion ratio of the lens closest to the object side in the first lens group is at a maximum, and among Abbe numbers of the lenses of the first lens group based on the d-line, an Abbe number of the second lens from the object side in the first lens group based on the d-line is at a maximum.

It is preferable that the imaging lens of the present invention satisfies at least one of the following conditional expressions (3) to (6) and (1-1) to (6-1).

$$2.5 < vZ - vY < 40 \quad (3)$$

$$-4 < f2/RYf < -1 \quad (4)$$

$$0.4 < f/f2 < 1 \quad (5)$$

$$-0.55 < f2/f1 < 0.5 \quad (6)$$

$$17 < v1 < 28 \quad (1-1)$$

$$-10 < v1 - vY < 0 \quad (2-1)$$

$$3 < vZ - vY < 35 \quad (3-1)$$

$$-3.5 < f2/RYf < -1.5 \quad (4-1)$$

$$0.45 < f/f2 < 0.8 \quad (5-1)$$

$$-0.5 < f2/f1 < 0.4 \quad (6-1)$$

Here, $vZ$ is an Abbe number of the Z lens based on a d-line,
$vY$ is an Abbe number of the Y lens based on a d-line,
$f2$ is a focal length of the second lens group,
$RYf$ is the radius of curvature of the object side surface of the Y lens,
f is a focal length of a whole system in a state where an infinite distance object is in focus,
$f1$ is a focal length of the first lens group, and
$v1$ is an Abbe number of the negative meniscus lens of the first lens group based on a d-line.

In the imaging lens of the present invention, it is preferable that the second lens group includes a W lens that is a negative lens which is formed continuously up to the X lens on the object side of the X lens and which has an absolute value of a radius of curvature of an image side surface smaller than an absolute value of a radius of curvature of an object side surface, and the following conditional expression (7) is satisfied.

$$0.1<(RXf-RWr)/(RXf+RWr)<3 \quad (7)$$

Here, RXf is a radius of curvature of an object side surface of the X lens, and

RWr is the radius of curvature of the image side surface of the W lens.

In the imaging lens of the present invention, it is preferable that the second lens group includes the W lens Lw having the configuration at the position, and in a case where the conditional expression (7) is satisfied, at least one or an arbitrary combination of the following conditional expressions (8) to (10) are satisfied.

$$0.01<dWX/f2<0.2 \quad (8)$$

$$0.5<f2/RWr<4 \quad (9)$$

$$-3<RWr/RYf<-0.5 \quad (10)$$

Here, dWX is an on-axis spacing between the image side surface of the W lens and the object side surface of the X lens, f2 is a focal length of the second lens group, RWr is the radius of curvature of the image side surface of the W lens, and RYf is the radius of curvature of the object side surface of the Y lens.

In the imaging lens of the present invention, it is preferable that the second lens group consists of, in order from the object side, a positive lens, a negative lens, the X lens, the Y lens, the Z lens. Then, with such a configuration, it is preferable that the imaging lens satisfies the following conditional expression (11).

$$0.75<f2/f21<2 \quad (11)$$

Here, f2 is a focal length of the second lens group, and f21 is a focal length of the positive lens closest to the object side in the second lens group.

In the imaging lens of the present invention, it is preferable that the diaphragm and the second lens group integrally move during focusing.

An imaging apparatus of the present invention comprises the imaging lens of the present invention.

It should be noted that the term "includes, substantially ~" means that the imaging lens may include not only the above-mentioned elements but also lenses substantially having no powers, optical elements, which are not lenses, such as a diaphragm and/or a cover glass, and mechanism parts such as a lens flange, a lens barrel, and/or a hand shaking correction mechanism.

In addition, reference signs of refractive powers of the lens groups, reference signs of refractive powers of the lenses, surface shapes of the lenses, and radii of curvature of the surfaces of the lenses are assumed as those in paraxial regions in a case where some lenses have aspheric surfaces. Reference signs of radii of curvature of surface shapes convex toward the object side are set to be positive, and reference signs of radii of curvature of surface shapes convex toward the image side are set to be negative. Further, unless otherwise noted, the above conditional expressions are based on the d-line (a wavelength of 587.6 nm, where nm represents nanometer).

According to the present invention, the lens system includes, in order from the object side, the first lens group that remains stationary during focusing; the diaphragm; and the positive second lens group that moves to the object side during focusing from the long distance object to the close-range object. In the lens system, the specific configuration of the first and second lens groups is set so as to satisfy predetermined conditional expressions. Thus, it is possible to provide an imaging lens that has a small number of lenses, has small fluctuation in aberrations caused by focusing, has small lateral chromatic aberration, and has a favorable optical performance, and an imaging apparatus comprising the imaging lens.

DESCRIPTION OF THE PREFERRED EMBODIMENTS

Figure 1:
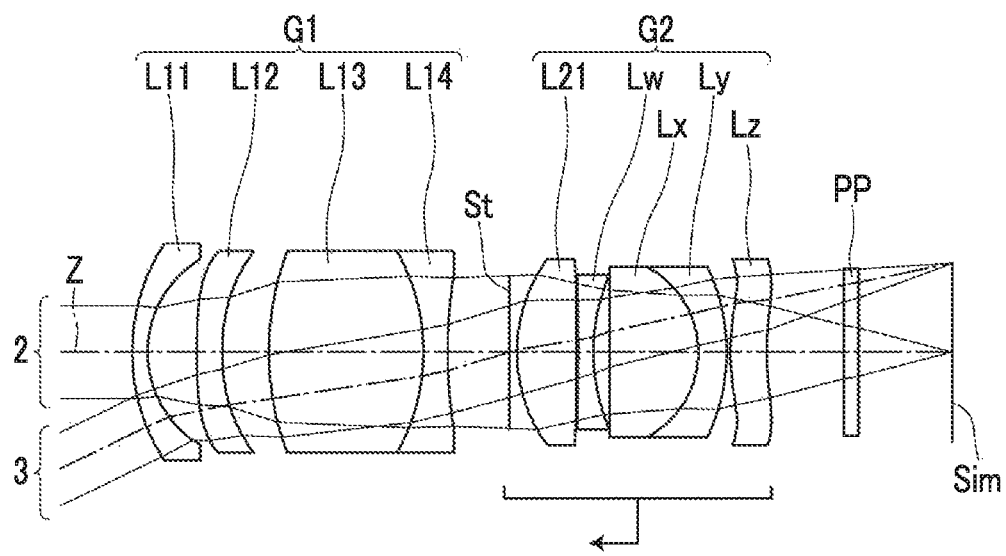
FIG. 1 is a cross-sectional view illustrating a configuration and an optical path of an imaging lens of Example 1 of the present invention.

Hereinafter, embodiments of the present invention will be described with reference to drawings. FIGS. 1 to 4 are cross-sectional views illustrating configurations and optical paths of imaging lenses according to an embodiment of the present invention, and respectively correspond to Examples 1 to 4 to be described later. Basic configurations and methods shown in the drawings of examples shown in FIGS. 1 to 4 are the same, and will be hereinafter described with reference to mainly the example shown in FIG. 1. FIG. 1 shows the state where the infinite distance object is in focus, and shows optical paths of on-axis rays 2 and off-axis rays 3 with the maximum angle of view, where the left side is the object side thereof, and the right side thereof is the image side.

The imaging lens is a single focus lens, and consists of, in order from the object side to the image side along an optical axis Z: a first lens group G1 that remains stationary with respect to the image plane Sim during focusing; an aperture diaphragm St; and a second lens group G2 that moves from the image side to the object side during focusing from a long distance object to a close-range object and has a positive refractive power as a whole. Such a configuration is advantageous in suppressing fluctuation in spherical aberration and fluctuation in astigmatism during focusing. In addition, an arrow below the second lens group G2 of FIG. 1 indicates a direction of movement during focusing.

In order to apply the imaging lens to an imaging apparatus, it is preferable to provide various filters and/or a protective cover glass based on specification of the imaging apparatus. Thus, FIG. 1 shows an example where a plane-parallel-plate-like optical member PP, in which those are considered, is disposed between the lens system and the image plane Sim. However, a position of the optical member PP is not limited to that shown in FIG. 1, and it is also possible to adopt a configuration in which the optical member PP is omitted.

In the example shown in FIG. 1, the first lens group G1 includes, in order from the object side, four lenses including a lens L11, a lens L12, a lens L13, and a lens L14. The second lens group G2 includes, in order from the object side, five lenses including a lens L21, a W lens Lw, an X lens Lx, a Y lens Ly, and a Z lens Lz.

The first lens group G1 of the imaging lens consists of, in order from the object side, a negative meniscus lens that has an absolute value of a radius of curvature of an image side surface smaller than an absolute value of a radius of curvature of an object side surface, a negative lens, a positive lens, and a negative lens. The lens L11, the lens L12, the lens L13, and the lens L14 respectively correspond to the negative meniscus lens, the negative lens, the positive lens, and the negative lens.

By setting the number of lenses constituting the first lens group G1 to four, a diameter of a lens closest to the object side is minimized, and thus this configuration is advantageous in reduction in size and costs. The negative meniscus lens having the above-mentioned shape is disposed on the most object side, and thereby this configuration is advantageous in correcting distortion. Further, it is possible to suppress occurrence of distortion while ensuring a back focal length thereof through two negative lenses including the lens L11 and the lens L12. As a result, distortion occurring in these two lenses can be corrected through the positive lens L13. Furthermore, it is possible to satisfactorily correct a chromatic aberration with a balance between longitudinal chromatic aberration and lateral chromatic aberration due to effects of the positive lens L13 and the negative lens L14.

More specifically, for example, the first lens group G1 may include, in order from the object side: a negative meniscus lens that is concave toward the image side; a negative lens that is concave toward the image side; a biconvex lens; and a negative lens that is concave toward the object side. Then, in such a case, a lens closest to the image side in the first lens group G1 and a second lens from the image side may be bonded and formed as a cemented lens.

The second lens group G2 consists of five or less lenses. With such a configuration, it is possible to achieve reduction in weight of the lens group which moves during focusing.

The second lens group G2 includes a Z lens Lz that is a positive lens formed continuously in order from a most image side, a Y lens Ly that is a negative lens having an absolute value of a radius of curvature of an object side surface smaller than an absolute value of a radius of curvature of an image side surface, an X lens Lx that is a positive lens.

The Y lens Ly, which is a negative lens, is configured to have an absolute value of a radius of curvature of an object side surface smaller than an absolute value of a radius of curvature of an image side surface, and thereby the object side surface of the Y lens Ly is formed as a concave surface. By forming the object side surface of the Y lens Ly, which is a negative lens with a high ray height of the off-axis principal ray, as a concave surface, it is possible to suppress fluctuation in astigmatism during focusing. Further, the first to third lenses from the image side of the second lens group G2 are arranged such that negative and positive lenses are alternately arranged in order of a positive lens, a negative lens, and a positive lens. Thereby, it is possible to suppress occurrence of off-axis high-order aberrations, particularly, high-order astigmatism, high-order distortion, and high-order lateral chromatic aberration. Then, a positive lens is disposed on the most image side, and thereby it is possible to minimize an angle of the principal ray with a peripheral angle of view incident onto the image plane Sim.

For example, as shown in FIG. 1, the Y lens Ly can be formed as a negative meniscus lens. The X lens Lx and the Y lens Ly may be bonded to each other. In such a case, it is possible to reduce the absolute value of the radius of curvature of the bonded surface while suppressing occurrence of high-order spherical aberration. As a result, this configuration is advantageous in correcting chromatic aberration. Further, the Z lens Lz can be formed to have a shape that is convex toward the object side.

The imaging lens of the present embodiment is configured to satisfy the following conditional expressions (1) and (2).

$$15 < \nu 1 < 35 \qquad (1)$$

$$-15 < \nu 1 - \nu Y < 10 \qquad (2)$$

Here, ν1 is an Abbe number of the negative meniscus lens of the first lens group based on a d-line, and νY is an Abbe number of the Y lens based on a d-line.

By not allowing the result of the conditional expression (1) to be equal to or less than the lower limit, it is possible to suppress 1st-order lateral chromatic aberration in an appropriate range. When lateral chromatic aberration caused by two negative lenses including the lens L11 and the lens L12 is corrected through the positive lens L13, focusing on the 1st-order chromatic aberration, it is preferable that a material having a large Abbe number is selected as a material of the positive lens L13. However, in this case, a difference between partial dispersion ratios of the positive lens and the negative lens becomes large, and thus 2nd-order lateral chromatic aberration occurs. By not allowing the result of the conditional expression (1) to be equal to or greater than the upper limit, the material having a large partial dispersion ratio can be selected on the lens L11 closest to the object side. Thus, this configuration is advantageous in suppressing occurrence of the 2nd-order chromatic aberration. At that time, this configuration is disadvantageous in correcting the 1st-order lateral chromatic aberration. However, by allowing the result of the conditional expression (2) to satisfy the lower limit at the same time, it is possible to cancel the 1st-order lateral chromatic aberration.

The conditional expression (2) is an expression relating to Abbe numbers of the lenses having negative refractive powers farthest with the aperture diaphragm St interposed therebetween, and these lenses have a great effect on lateral chromatic aberration. By making the Abbe numbers of these lenses approximate to each other such that the conditional expression (2) is satisfied, it is possible to suppress lateral chromatic aberration in an appropriate range.

In order to enhance the effect of the conditional expression (1), it is preferable that the following conditional expression (1-1) is satisfied and the following conditional expression (1-2) is satisfied.

$$17 < \nu 1 < 28 \tag{1-1}$$

$$19 < \nu 1 < 24 \tag{1-2}$$

In order to enhance the effect of the conditional expression (2), it is preferable that the following conditional expression (2-1) is satisfied and the following conditional expression (2-2) is satisfied.

$$-10 < \nu 1 - \nu Y < 0 \tag{2-1}$$

$$-7 < \nu 1 - \nu Y < -2 \tag{2-2}$$

It is preferable to adopt the following configuration: among partial dispersion ratios of the lenses of the first lens group G1 at a g-line and an F-line, a partial dispersion ratio of the lens closest to the object side in the first lens group G1 is at a maximum; and among Abbe numbers of the lenses of the first lens group G1 based on the d-line, an Abbe number of the second lens from the object side in the first lens group G1 is at a maximum. Here, a partial dispersion ratio θgF of a certain lens at the g-line and the F-line is defined by θgF=(Ng−NF)/(NF−NC), where Ng, NF, and NC are refractive indexes of the lens at the g-line, the F-line, and the C-line.

In the first lens group G1, regarding the partial dispersion ratio, the partial dispersion ratio of the lens L11 is selected to be at a maximum, and regarding the Abbe number, the Abbe number of the lens L12 is selected to be at a maximum. Thus, this configuration is advantageous in suppressing occurrence of the 1st-order and 2nd-order lateral chromatic aberrations of the entire first lens group G1 at the same time. Reversed 2nd-order lateral chromatic aberration larger than the 2nd-order lateral chromatic aberration caused by the positive lens L13 of the first lens group G1 is caused by the negative lens L11, and is balanced with the 2nd-order lateral chromatic aberration caused by the negative lens L12. In a case of a material satisfying the upper limit of the conditional expression (1), generally, as an Abbe number thereof decreases, a partial dispersion ratio thereof drastically increases. Hence, by satisfying the conditional expression (1) and performing the above-mentioned selection at the same time, it is possible to decrease a difference between the Abbe numbers of the negative lens L11 and the positive lens L13 while ensuring a difference between the partial dispersion ratios of the negative lens L11 and the positive lens L13. As a result, it is possible to prevent the 1st-order lateral chromatic aberration from deteriorating. A ray height of principal rays of the lens L11 is greater than that of the lens L12, and the effect of the lens L11 in correction of the 2nd-order lateral chromatic aberration is larger than that of the lens L12. Thus, not for the lens L12 but for the lens L11, a material, which makes the partial dispersion ratio thereof be at the maximum, is selected, and thereby it is possible to enhance the above-mentioned effect rather than that in a case where the partial dispersion ratio of the lens L12 is made to be at the maximum. Further, by maximizing the Abbe number of the negative lens L12 in the first lens group G1, it is possible to suppress occurrence of the 1st-order chromatic aberration.

It is preferable that the imaging lens satisfies at least one or an arbitrary combination of the following conditional expressions (3) to (6).

$$2.5 < \nu Z - \nu Y < 40 \tag{3}$$

$$-4 < f2/RYf < -1 \tag{4}$$

$$0.4 < f/f2 < 1 \tag{5}$$

$$-0.55 < f2/f1 < 0.5 \tag{6}$$

Here, νZ is an Abbe number of the Z lens based on a d-line,
νY is an Abbe number of the Y lens based on a d-line,
f2 is a focal length of the second lens group,
RYf is the radius of curvature of the object side surface of the Y lens,
f is a focal length of a whole system in a state where an infinite distance object is in focus, and
f1 is a focal length of the first lens group.

By selecting a material of the lens such that the conditional expression (3) is satisfied, it is possible to suppress lateral chromatic aberration in an appropriate range. In order to enhance the effect of the conditional expression (3), it is more preferable that the following conditional expression (3-1) is satisfied, and it is yet more preferable that the following conditional expression (3-2) is satisfied.

$$3 < \nu Z - \nu Y < 35 \tag{3-1}$$

$$3.5 < \nu Z - \nu Y < 28 \tag{3-2}$$

By not allowing the result of the conditional expression (4) to be equal to or less than the lower limit, it is possible to prevent high-order spherical aberration, which is excessively corrected, from occurring. By not allowing the result of the conditional expression (4) to be equal to or greater than the upper limit, it is possible to suppress fluctuation in spherical aberration during focusing. In order to enhance the effect of the conditional expression (4), it is more preferable that the following conditional expression (4-1) is satisfied, and it is yet more preferable that the following conditional expression (4-2) is satisfied.

$$-3.5 < f2/RYf < -1.5 \tag{4-1}$$

$$-3 < f2/RYf < -2.5 \tag{4-2}$$

By not allowing the result of the conditional expression (5) to be equal to or less than the lower limit, it is possible to suppress an amount of movement of the second lens group G2 during focusing. By not allowing the result of the conditional expression (5) to be equal to or greater than the upper limit, it is possible to suppress fluctuation in spherical aberration during focusing. In order to enhance the effect of the conditional expression (5), it is more preferable that the following conditional expression (5-1) is satisfied, and it is yet more preferable that the following conditional expression (5-2) is satisfied.

$$0.45 < f/f2 < 0.8 \tag{5-1}$$

$$0.6 < f/f2 < 0.7 \tag{5-2}$$

By not allowing the result of the conditional expression (6) to be equal to or less than the lower limit, it is possible to suppress an amount of movement of the second lens group G2 during focusing. By not allowing the result of the conditional expression (6) to be equal to or greater than the upper limit, it is possible to suppress fluctuation in spherical aberration during focusing. In order to enhance the effect of the conditional expression (6), it is more preferable that the following conditional expression (6-1) is satisfied, and it is yet more preferable that the following conditional expression (6-2) is satisfied.

$$-0.5 < f2/f1 < 0.4 \quad (6\text{-}1)$$

$$-0.25 < f2/f1 < 0.35 \quad (6\text{-}2)$$

It is preferable that the second lens group G2 includes a W lens Lw that is a negative lens which is formed continuously up to the X lens Lx on the object side of the X lens Lx and which has an absolute value of a radius of curvature of an image side surface smaller than an absolute value of a radius of curvature of an object side surface. The W lens Lw as a negative lens is configured such that the absolute value of the radius of curvature of the image side surface is smaller than the absolute value of the radius of curvature of the object side surface, and thereby the image side surface of the W lens Lw is formed as a concave surface. By providing the W lens Lw in the second lens group G2, a negative refractive power can be shared by the image side surface of the W lens Lw and the object side surface of the Y lens Ly as negative lenses. Therefore, by appropriately correcting spherical aberration of the second lens group G2 as a focusing group, it is possible to suppress fluctuation in spherical aberration during focusing.

Then, in a case where the second lens group G2 includes the W lens Lw that has the above-mentioned configuration and is placed at the above-mentioned position, it is preferable that the following conditional expression (7) is satisfied.

$$0.1 < (RXf - RWr)/(RXf + RWr) < 3 \quad (7)$$

Here, RXf is a radius of curvature of an object side surface of the X lens, and

RWr is the radius of curvature of the image side surface of the W lens.

The conditional expression (7) is an expression about a shape of an air lens which is formed between the W lens Lw and the X lens Lx. Here, changes in the ray height when rays pass through the air lens, that is, differences between ray heights of the rays at the object side surface of the air lens and ray heights thereof at the image side surface are considered. By not allowing the result of the conditional expression (7) to be equal to or less than the lower limit, it is possible to provide a sufficient negative refractive power to the air lens. Thereby, rays, which pass through a part of the air lens far from the optical axis Z, can be made to have smaller changes in ray height when passing through the air lens than rays which pass through a part thereof in the vicinity of the optical axis Z. In particular, in a case where both the object side surface of the X lens Lx and the image side surface of the W lens Lw are spherical surfaces, by not allowing the result of the conditional expression (7) to be equal to or less than the lower limit, among the rays passing through the air lens, rays farther from the optical axis Z can be made to have smaller changes in ray height when passing through the air lens. Further, even in case where at least one of the object side surface of the X lens Lx and the image side surface of the W lens Lw is an aspheric surface, it is possible to obtain the same effect mentioned above as long as a shape of the aspheric surface has no inflection point within an effective diameter. Due to the above-mentioned effect, it is possible to prevent high-order aberrations, particularly, high-order spherical aberration and high-order astigmatism from being excessively corrected while suppressing fluctuation in low-order spherical aberration and fluctuation in low-order astigmatism during focusing. As a result, this configuration is advantageous in achieving a lens system having a small F number. Further, by not allowing the result of the conditional expression (7) to be equal to or greater than the upper limit, it is possible to suppress fluctuation in low-order spherical aberration and fluctuation in low-order astigmatism during focusing. In order to enhance the effect of the conditional expression (7), it is more preferable that the following conditional expression (7-1) is satisfied, and it is yet more preferable that the following conditional expression (7-2) is satisfied.

$$0.2 < (RXf - RWr)/(RXf + RWr) < 1.8 \quad (7\text{-}1)$$

$$0.7 < (RXf - RWr)/(RXf + RWr) < 1.05 \quad (7\text{-}2)$$

It is preferable that the second lens group G2 includes the W lens Lw having the configuration at the position, and in a case where the conditional expression (7) is satisfied, at least one or an arbitrary combination of the following conditional expressions (8) to (10) are satisfied.

$$0.01 < dWX/f2 < 0.2 \quad (8)$$

$$0.5 < f2/RWr < 4 \quad (9)$$

$$-3 < RWr/RYf < -0.5 \quad (10)$$

Here, dWX is an on-axis spacing between the image side surface of the W lens and the object side surface of the X lens, f2 is a focal length of the second lens group, RWr is the radius of curvature of the image side surface of the W lens, and RYf is the radius of curvature of the object side surface of the Y lens.

dWX of the conditional expression (8) corresponds to a center thickness of the air lens. By not allowing the result of the conditional expression (8) to be equal to or less than the lower limit, it is possible to enhance the effect relating to the lower limit of the above-mentioned conditional expression (7). In addition, if the spacing between surfaces forming the air lens excessively increases, the effect of the air lens becomes weak. Thus, by not allowing the result of the conditional expression (8) to be equal to or greater than the upper limit, it is possible to ensure the effect of the air lens, and it is possible to suppress fluctuation in astigmatism during focusing. In order to enhance the effect of the conditional expression (8), it is more preferable that the following conditional expression (8-1) is satisfied, and it is yet more preferable that the following conditional expression (8-2) is satisfied.

$$0.03 < dWX/f2 < 0.15 \quad (8\text{-}1)$$

$$0.05 < dWX/f2 < 0.08 \quad (8\text{-}2)$$

By not allowing the result of the conditional expression (9) to be equal to or less than the lower limit, it is possible to suppress fluctuation in spherical aberration during focusing. By not allowing the result of the conditional expression (9) to be equal to or greater than the upper limit, it is possible to suppress fluctuation in astigmatism during focusing. In order to enhance the effect of the conditional expression (9), it is more preferable that the following conditional expression (9-1) is satisfied, and it is yet more preferable that the following conditional expression (9-2) is satisfied.

$$0.8 < f2/RWr < 3 \quad (9\text{-}1)$$

$$1.3 < f2/RWr < 2.7 \quad (9\text{-}2)$$

By selecting a shape of a concave surface belonging to two negative lenses within the second lens group G2 such that the conditional expression (10) is satisfied, it is possible to correct spherical aberration and astigmatism with good balance. In order to enhance the effect of the conditional expression (10), it is more preferable that the following conditional expression (10-1) is satisfied, and it is yet more preferable that the following conditional expression (10-2) is satisfied.

$$-2.5 < RWr/RYf < -0.8 \tag{10-1}$$

$$-2.2 < RWr/RYk - 1.1 \tag{10-2}$$

It is preferable that the second lens group G2 consists of, in order from the object side, a positive lens, a negative lens, the X lens Lx, the Y lens Ly, the Z lens Lz. In such a case, positive and negative powers are alternately set in the second lens group G2. Thereby, it is possible to prevent a ray height of the on-axis marginal ray from excessively increasing. As a result, it is possible to suppress occurrence of high-order spherical aberration.

In a case where the second lens group G2 consists of the five lenses, it is preferable that the following conditional expression (11) is satisfied.

$$0.75 < f2/f21 < 2 \tag{11}$$

Here, f2 is a focal length of the second lens group, and f21 is a focal length of the positive lens closest to the object side in the second lens group.

By not allowing the result of the conditional expression (11) to be equal to or less than the lower limit, a positive refractive power of the second lens group G2 is appropriately shared by the elements in the group. As a result, it is possible to suppress fluctuation in spherical aberration during focusing. By not allowing the result of the conditional expression (11) to be equal to or greater than the upper limit, it is possible to suppress occurrence of high-order spherical aberration. In order to enhance the effect of the conditional expression (11), it is more preferable that the following conditional expression (11-1) is satisfied, and it is yet more preferable that the following conditional expression (11-2) is satisfied.

$$0.8 < f2/f21 < 1.8 \tag{11-1}$$

$$1 < f2/f21 < 1.45 \tag{11-2}$$

In the imaging lens, it is preferable that the aperture diaphragm St and the second lens group G2 integrally move during focusing. In such a case, it is possible to reduce fluctuation in off-axis aberrations during focusing.

At least one lens constituting the imaging lens may be made of a plastic material. In such a case, it is possible to reduce a weight and costs of the lens system.

In the above description of aberrations, the term "low-order" means the 3rd order, and the term "high-order" means an order equal to or higher than 5th order. Further, in the above description, the "ray height" means a height of rays from the optical axis Z.

The above-mentioned preferred configurations and/or available configurations may be arbitrary combinations, and it is preferable to selectively adopt the configurations in accordance with required specification. According to the present embodiment, it is possible to realize an imaging lens that has a small number of lenses, has small fluctuation in aberrations caused by focusing, has small lateral chromatic aberration, and has a favorable optical performance. It should be noted that the term "small number of lenses" described herein means that the number of lenses constituting the whole system is equal to or less than nine.

Next, numerical examples of the imaging lens of the present invention will be described.

Example 1

A lens configuration of an imaging lens of Example 1 is shown in FIG. 1, and a configuration and a method thereof shown in the drawing is as described above. Therefore, repeated description is partially omitted herein. The imaging lens of Example 1 includes, in order from the object side: the first lens group G1 that has a negative refractive power; the aperture diaphragm St; and the second lens group G2 that has a positive refractive power. During focusing from an infinite distance object to a close-range object, the first lens group G1 remains stationary with respect to the image plane Sim, and the second lens group G2 and the aperture diaphragm St integrally move from the image side to the object side. The first lens group G1 includes, in order from the object side, the four lenses L11 to L14, and the second lens group G2 includes, in order from the object side, five lenses including the lens L21, the W lens Lw, the X lens Lx, the Y lens Ly, and the Z lens Lz. It should be noted that the configuration described herein is the same as those of the imaging lenses of examples to be described later, in terms of the configuration using two groups, the first lens group G1 formed of four lenses, the second lens group G2 formed of five lenses, and the behavior thereof during focusing.

Table 1 shows basic lens data of the imaging lens of Example 1, Table 2 shows specification and variable surface spacings, and Table 3 shows aspheric coefficients thereof. In Table 1, the column of Si shows i-th (i=1, 2, 3, . . . ) surface number. The i-th surface number is attached to each of surfaces of the elements, where i sequentially increases toward the image side when a surface of an element closest to the object side is regarded as a first surface. The column of Ri shows a radius of curvature of the i-th surface. The column of Di shows a surface spacing on the optical axis Z between the i-th surface and an i+1 surface. In Table 1, the column of Ndj shows a refractive index of a j-th (j=1, 2, 3, . . . ) component at the d-line (a wavelength of 587.6 nm), where j sequentially increases toward the image side when the surface of the element closest to the object side is regarded as the first surface. The column of vdj shows an Abbe number of the j-th component on the basis of the d-line. The column of θgFj shows a partial dispersion ratio between the g-line (a wavelength of 435.8 nm) and the F-line (a wavelength of 486.1 nm) of the j-th component.

Here, reference signs of radii of curvature of surface shapes convex toward the object side are set to be positive, and reference signs of radii of curvature of surface shapes convex toward the image side are set to be negative. Table 1 additionally shows the aperture diaphragm St and the optical member PP. In Table 1, in a place of a surface number of a surface corresponding to the aperture diaphragm St, the surface number and a term of (St) are noted. A value at the bottom place of Di indicates a spacing between the image plane Sim and the surface closest to the image side in the table. In Table 1, the variable surface spacings, which are variable during focusing, are referenced by the reference signs DD[ ], and are written into places of Di, where object side surface numbers of spacings are noted in [ ].

Table 2 shows values of the focal length f' of the whole system, the F number FNo., the maximum total angle of view 2ω, and the variable surface spacing, on the basis of d-line. (o) in the place of 2ω indicates that the unit thereof is a degree. In Table 2, the column denoted by the infinite distance shows respective values thereof in a state where the infinite distance object is in focus, and the column denoted by 100 mm shows respective values thereof in a state where an object at an object distance of 100 mm is in focus.

In Table 1, the reference sign * is attached to surface numbers of aspheric surfaces, and numerical values of the paraxial radius of curvature are written into the column of the radius of curvature of the aspheric surface. Table 3 shows aspheric coefficients of the aspheric surfaces of Example 1. The "E−n" (n: an integer) in numerical values of the aspheric coefficients of Table 3 indicates "×10$^{-n}$". The aspheric coefficients are values of the coefficients KA and Am (m=3, 4, 5, . . . 20) in aspheric surface expression represented as the following expression.

$$Zd = \frac{C \times h^2}{1 + \sqrt{1 - KA \times C^2 \times h^2}} + \sum_m Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial radius of curvature, and KA and Am are aspheric coefficients.

In data of each table, a degree is used as a unit of an angle, and mm is used as a unit of a length, but appropriate different units may be used since the optical system can be used even in a case where the system is enlarged or reduced in proportion. Further, the following each table describes numerical values rounded off to predetermined decimal places.

TABLE 1

Example 1

| Si | Ri | Di | Ndj | νdj | θgFj |
|---|---|---|---|---|---|
| 1 | 12.83562 | 1.000 | 1.90366 | 31.31 | 0.59481 |
| 2 | 6.99091 | 3.182 | | | |
| *3 | 61.98746 | 1.645 | 1.53391 | 55.87 | 0.55939 |
| *4 | 14.43584 | 3.022 | | | |
| 5 | 18.42163 | 10.000 | 1.83400 | 37.16 | 0.57759 |
| 6 | −13.22022 | 1.566 | 1.51742 | 52.43 | 0.55649 |
| 7 | 29.82262 | DD [7] | | | |
| 8 (St) | ∞ | 0.500 | | | |
| 9 | 10.16723 | 3.847 | 1.77250 | 49.60 | 0.55212 |
| 10 | −225.33523 | 0.100 | | | |
| 11 | −376.41576 | 1.000 | 1.80518 | 25.42 | 0.61616 |
| 12 | 12.54542 | 1.039 | | | |
| 13 | ∞ | 5.752 | 1.61800 | 63.33 | 0.54414 |
| 14 | −6.19663 | 1.830 | 1.80000 | 29.84 | 0.60178 |
| 15 | −12.78905 | 0.234 | | | |
| *16 | 13.49042 | 2.364 | 1.53391 | 55.87 | 0.55939 |
| *17 | 17.26842 | DD [17] | | | |
| 18 | ∞ | 1.000 | 1.51633 | 64.14 | 0.53531 |
| 19 | ∞ | 6.060 | | | |

TABLE 2

Example 1

| | INFINITE DISTANCE | 100 mm |
|---|---|---|
| f | 12.010 | 12.153 |
| FNo. | 2.00 | 2.13 |
| 2ω (°) | 51.0 | 48.4 |
| DD [7] | 3.935 | 2.490 |
| DD [17] | 5.000 | 6.445 |

TABLE 3

Example 1

| | SURFACE NUMBER | | | |
|---|---|---|---|---|
| | 3 | 4 | 16 | 17 |
| KA | 1.0000000E+00 | 1.0000000E+00 | 1.0000000E+00 | 1.0000000E+00 |
| A3 | 6.9388939E−19 | 0.0000000E+00 | 2.0383001E−18 | 6.9388939E−19 |
| A4 | 3.4810087E−04 | −5.9275763E−04 | −1.1310106E−03 | −6.3914091E−04 |
| A5 | 8.1741868E−05 | 1.0757143E−03 | 4.9024198E−04 | 1.5457730E−05 |
| A6 | 5.2900992E−05 | −3.9103308E−04 | −1.1083102E−04 | 6.8293275E−05 |
| A7 | −2.9760433E−05 | 1.5842551E−05 | −3.6126998E−05 | −4.5677841E−05 |
| A8 | −1.3440509E−07 | 2.5517890E−05 | 1.3683629E−05 | 3.8084317E−06 |
| A9 | 1.9541905E−06 | −5.3992076E−06 | 1.1810234E−06 | 2.7991788E−06 |
| A10 | −1.4468915E−07 | −4.1212356E−07 | −7.2957209E−07 | −4.7132806E−07 |
| A11 | −6.0130002E−08 | 2.3443076E−07 | −2.2137803E−08 | −8.2712995E−08 |
| A12 | 6.0633586E−09 | −7.8401978E−09 | 2.1501033E−08 | 1.7717389E−08 |
| A13 | 1.0428727E−09 | −4.8035027E−09 | 2.4538411E−10 | 1.3882993E−09 |
| A14 | −1.0992450E−10 | 3.9356177E−10 | −3.7021590E−10 | −3.3508292E−10 |
| A15 | −1.0436296E−11 | 5.2706647E−11 | −1.5591446E−12 | −1.3484271E−11 |
| A16 | 1.0129092E−12 | −6.0304373E−12 | 3.7000591E−12 | 3.4525756E−12 |
| A17 | 5.6214703E−14 | −2.9943536E−13 | 5.0635543E−15 | 7.0663743E−14 |
| A18 | −4.5724991E−15 | 4.2050227E−14 | −1.9871592E−14 | −1.8507095E−14 |
| A19 | −1.2619718E−16 | 6.9331013E−16 | −6.0048612E−18 | −1.5473950E−16 |
| A20 | 7.8042185E−18 | −1.1309025E−16 | 4.4334504E−17 | 4.0461628E−17 |

Figure 5:
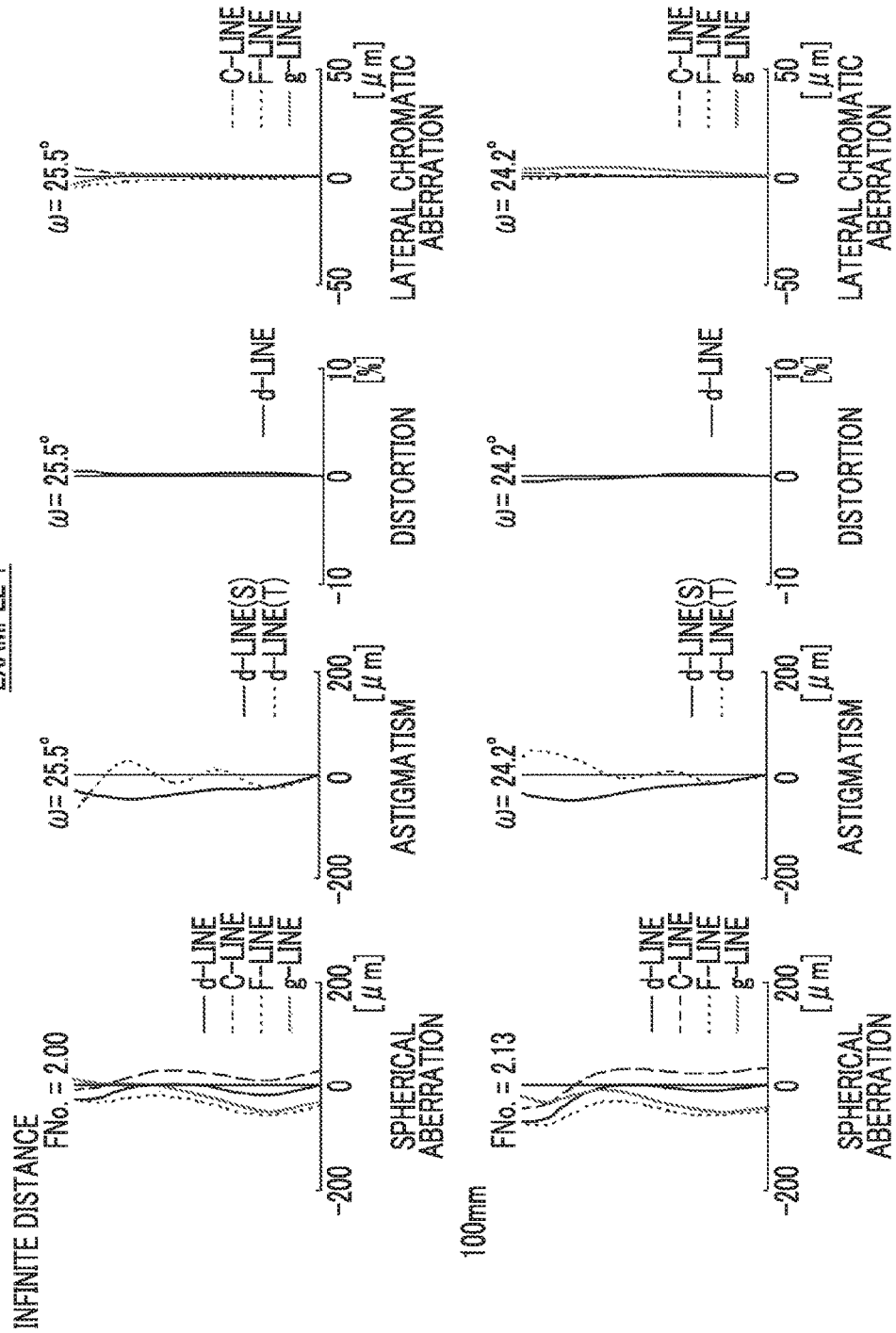
FIG. 5 is a diagram of aberrations of the imaging lens of Example 1 of the present invention, where the diagram includes spherical aberration diagram, astigmatism diagram, distortion diagram, and lateral chromatic aberration diagram, in order from the left side thereof.

FIG. 5 shows aberration diagrams of the imaging lens of Example 1. In order from the left side on the upper side of FIG. 5 denoted by the "infinite distance", spherical aberration, astigmatism, distortion, and lateral chromatic aberration (chromatic aberration of magnification) in a state where the infinite distance object is in focus are shown. In order from the left side on the lower side denoted by the "100 mm", spherical aberration, astigmatism, distortion, and lateral chromatic aberration in a state where the object at the object distance of 100 mm is in focus are shown. In the spherical aberration diagram, aberrations at the d-line (a wavelength of 587.6 nm), the C-line (a wavelength of 656.3 nm), the F-line (a wavelength of 486.1 nm), and the g-line (a wavelength of 435.8 nm) are respectively indicated by the solid line, the long dashed line, the short dashed line, and the gray solid line. In the astigmatism diagram, aberration in the sagittal direction at the d-line is indicated by the solid line, and aberration in the tangential direction at the d-line is indicated by the short dashed line. In the distortion diagram, aberration at the d-line is indicated by the solid line. In the lateral chromatic aberration, aberrations at the C-line, the F-line, and the g-line are respectively indicated by the long dashed line, the short dashed line, and the gray solid line. In the spherical aberration diagram, FNo. indicates an F number. In the other aberration diagrams, ω indicates a half angle of view.

In the description of Example 1, reference signs, meanings, and description methods of the respective data pieces are the same as those in the following examples unless otherwise noted. Therefore, in the following description, repeated description will be omitted.

Example 2

Figure 2:
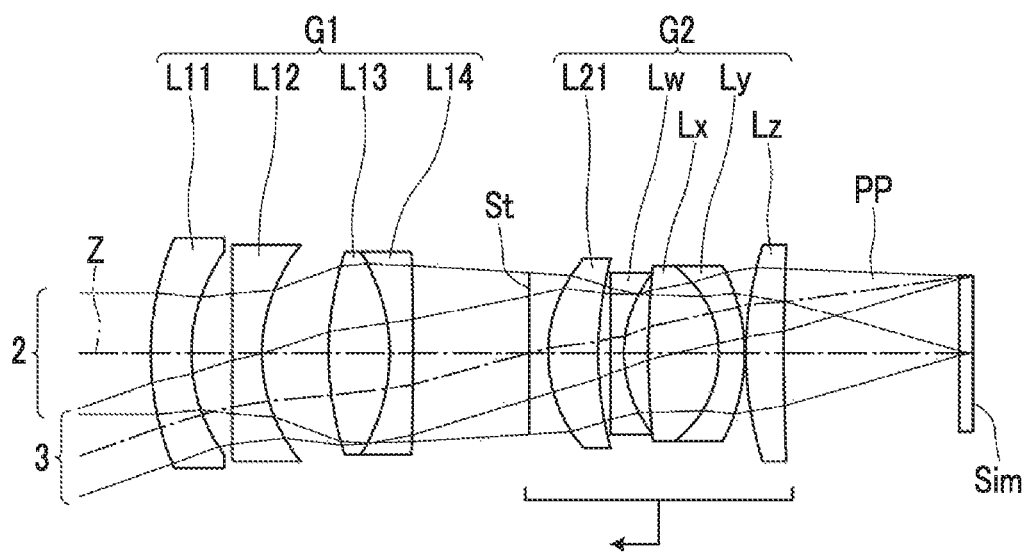
FIG. 2 is a cross-sectional view illustrating a configuration and an optical path of an imaging lens of Example 2 of the present invention.
Figure 6:
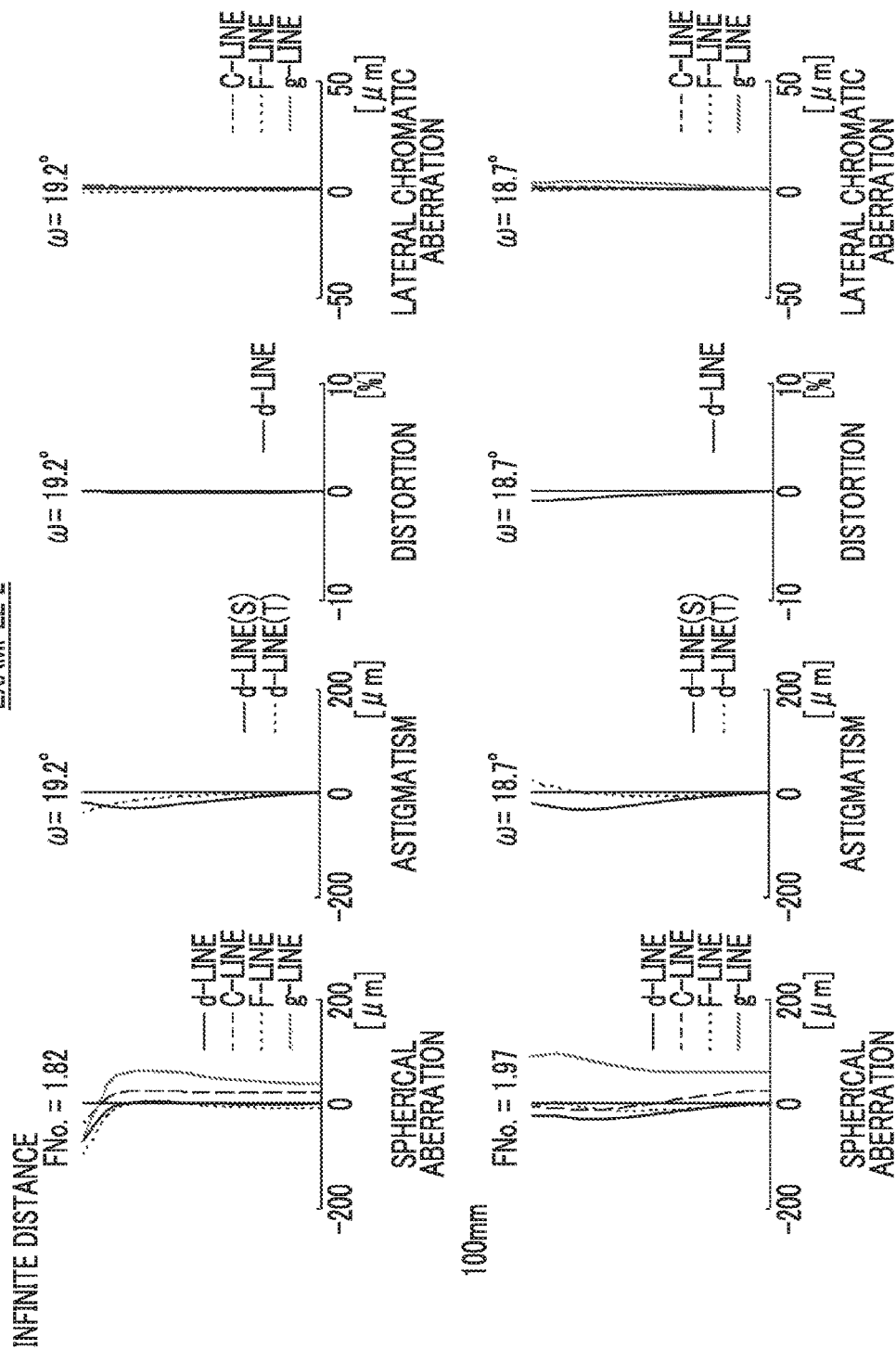
FIG. 6 is a diagram of aberrations of the imaging lens of Example 2 of the present invention, where the diagram includes spherical aberration diagram, astigmatism diagram, distortion diagram, and lateral chromatic aberration diagram, in order from the left side thereof.

FIG. 2 shows a lens configuration of the imaging lens of Example 2. The imaging lens of Example 2 includes, in order from the object side: the first lens group G1 that has a positive refractive power; the aperture diaphragm St; and the second lens group G2 that has a positive refractive power. Table 4 shows basic lens data of the imaging lens of Example 2, Table 5 shows specification and variable surface spacings, and FIG. 6 shows aberration diagrams thereof.

TABLE 4

Example 2

| Si | Ri | Di | Ndj | νdj | θgFj |
|---|---|---|---|---|---|
| 1 | 21.53196 | 3.000 | 1.85896 | 22.73 | 0.62844 |
| 2 | 12.76478 | 3.017 | | | |
| 3 | ∞ | 2.200 | 1.51680 | 64.20 | 0.53430 |
| 4 | 12.59175 | 4.938 | | | |
| 5 | 24.28282 | 4.500 | 1.80400 | 46.58 | 0.55730 |
| 6 | −14.12611 | 1.731 | 1.51742 | 52.43 | 0.55649 |
| 7 | −190.31176 | DD [7] | | | |
| 8 (St) | ∞ | 1.407 | | | |
| 9 | 10.71771 | 3.700 | 1.80420 | 46.50 | 0.55799 |
| 10 | 27.18793 | 0.900 | | | |
| 11 | ∞ | 1.000 | 1.72825 | 28.32 | 0.60590 |
| 12 | 9.41592 | 1.800 | | | |
| 13 | 62.95120 | 5.210 | 1.59522 | 67.73 | 0.54426 |
| 14 | −8.10000 | 1.900 | 2.00069 | 25.46 | 0.61364 |
| 15 | −13.86280 | 0.100 | | | |
| 16 | 26.24165 | 2.800 | 1.85150 | 40.78 | 0.56958 |
| 17 | 171.47944 | DD [17] | | | |
| 18 | ∞ | 1.000 | 1.51680 | 64.20 | 0.53430 |
| 19 | ∞ | 0.050 | | | |

TABLE 5

Example 2

| | INFINITE DISTANCE | 100 mm |
|---|---|---|
| f | 16.460 | 16.130 |
| FNo. | 1.82 | 1.97 |
| 2ω (°) | 38.4 | 37.4 |
| DD [7] | 8.500 | 6.001 |
| DD [17] | 13.000 | 15.499 |

Example 3

Figure 3:
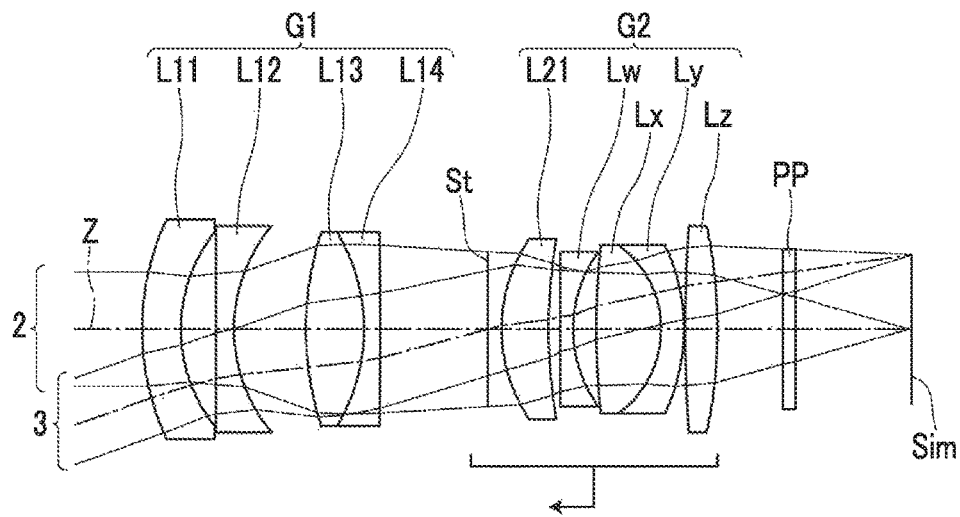
FIG. 3 is a cross-sectional view illustrating a configuration and an optical path of an imaging lens of Example 3 of the present invention.
Figure 7:
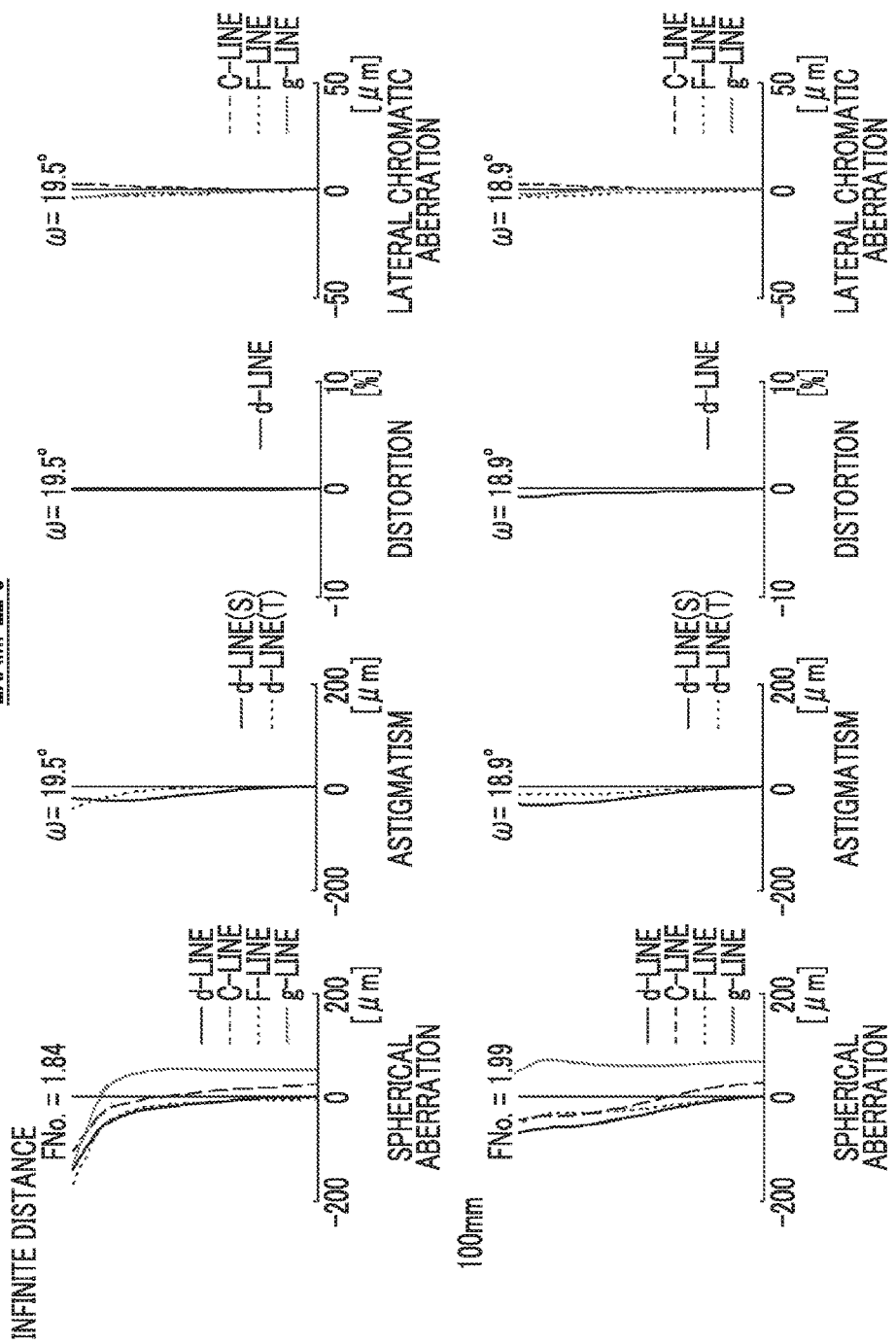
FIG. 7 is a diagram of aberrations of the imaging lens of Example 3 of the present invention, where the diagram includes spherical aberration diagram, astigmatism diagram, distortion diagram, and lateral chromatic aberration diagram, in order from the left side thereof.

FIG. 3 shows a lens configuration of the imaging lens of Example 3. The imaging lens of Example 3 includes, in order from the object side: the first lens group G1 that has a positive refractive power; the aperture diaphragm St; and the second lens group G2 that has a positive refractive power. Table 6 shows basic lens data of the imaging lens of Example 3, Table 7 shows specification and variable surface spacings, and FIG. 7 shows aberration diagrams thereof.

TABLE 6

Example 3

| Si | Ri | Di | Ndj | νdj | θgFj |
|---|---|---|---|---|---|
| 1 | 19.97009 | 3.000 | 1.85896 | 22.73 | 0.62844 |
| 2 | 12.06472 | 2.700 | | | |
| 3 | ∞ | 1.400 | 1.51680 | 64.20 | 0.53430 |
| 4 | 12.44048 | 5.563 | | | |
| 5 | 24.28282 | 4.500 | 1.80400 | 46.58 | 0.55730 |
| 6 | −14.45947 | 1.260 | 1.51742 | 52.43 | 0.55649 |
| 7 | −308.55780 | DD [7] | | | |
| 8 (St) | ∞ | 1.032 | | | |
| 9 | 12.14036 | 3.700 | 1.95375 | 32.32 | 0.59015 |
| 10 | 40.09335 | 0.900 | | | |
| 11 | ∞ | 1.000 | 1.87614 | 21.19 | 0.62645 |
| 12 | 10.15102 | 1.800 | | | |
| 13 | 62.95120 | 5.010 | 1.59522 | 67.73 | 0.54426 |
| 14 | −8.10000 | 1.763 | 2.00069 | 25.46 | 0.61364 |
| 15 | −15.21517 | 0.100 | | | |
| 16 | 115.19402 | 2.500 | 2.00100 | 29.13 | 0.59952 |
| 17 | −38.51715 | DD [17] | | | |
| 18 | ∞ | 1.000 | 1.51680 | 64.20 | 0.53430 |
| 19 | ∞ | 9.040 | | | |

TABLE 7

Example 3

| | INFINITE DISTANCE | 100 mm |
|---|---|---|
| f | 16.251 | 15.963 |
| FNo. | 1.84 | 1.99 |
| 2ω (°) | 39.0 | 37.8 |
| DD [7] | 8.331 | 5.891 |
| DD [17] | 5.000 | 7.440 |

Example 4

Figure 4:
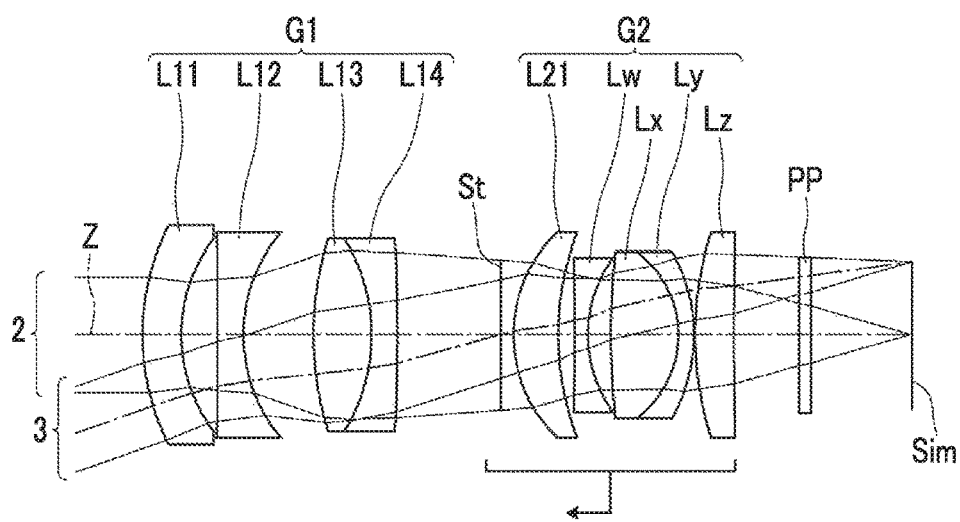
FIG. 4 is a cross-sectional view illustrating a configuration and an optical path of an imaging lens of Example 4 of the present invention.
Figure 8:
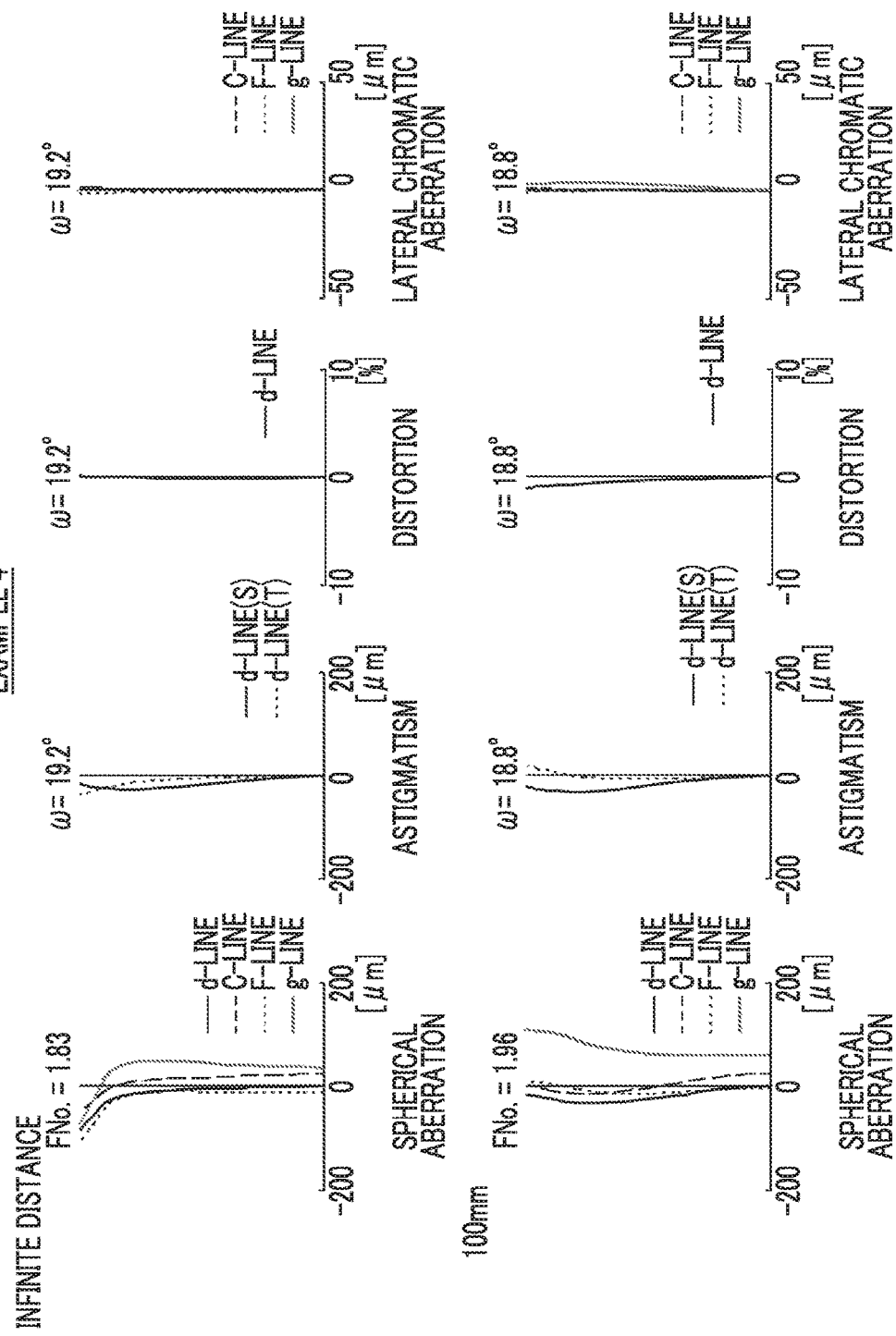
FIG. 8 is a diagram of aberrations of the imaging lens of Example 4 of the present invention, where the diagram includes spherical aberration diagram, astigmatism diagram, distortion diagram, and lateral chromatic aberration diagram, in order from the left side thereof.

FIG. 4 shows a lens configuration of the imaging lens of Example 4. The imaging lens of Example 4 includes, in order from the object side: the first lens group G1 that has a positive refractive power; the aperture diaphragm St; and the second lens group G2 that has a positive refractive power. Table 8 shows basic lens data of the imaging lens of Example 4, Table 9 shows specification and variable surface spacings, and FIG. 8 shows aberration diagrams thereof.

TABLE 8

Example 4

| Si | Ri | Di | Ndj | vdj | θgFj |
|---|---|---|---|---|---|
| 1 | 19.00636 | 3.000 | 2.00272 | 19.32 | 0.64514 |
| 2 | 12.49794 | 2.800 | | | |
| 3 | −751.82818 | 2.000 | 1.51680 | 64.20 | 0.53430 |
| 4 | 12.48453 | 5.428 | | | |
| 5 | 25.26094 | 4.500 | 1.81600 | 46.62 | 0.55682 |
| 6 | −14.46937 | 2.010 | 1.51742 | 52.43 | 0.55649 |
| 7 | −141.14259 | DD [7] | | | |
| 8 (St) | ∞ | 1.000 | | | |
| 9 | 10.99825 | 3.500 | 1.80420 | 46.50 | 0.55799 |
| 10 | 22.37568 | 1.300 | | | |
| 11 | −218.98080 | 1.000 | 1.72825 | 28.32 | 0.60590 |
| 12 | 10.27456 | 1.800 | | | |
| 13 | 62.95120 | 5.210 | 1.59522 | 67.73 | 0.54426 |
| 14 | −8.10000 | 1.200 | 2.00069 | 25.46 | 0.61364 |
| 15 | −13.28640 | 0.100 | | | |
| 16 | 26.60961 | 3.000 | 1.88100 | 40.14 | 0.57010 |
| 17 | 281.33610 | DD [17] | | | |
| 18 | ∞ | 1.000 | 1.51680 | 64.20 | 0.53430 |
| 19 | ∞ | 7.853 | | | |

TABLE 9

Example 4

| | INFINITE DISTANCE | 100 mm |
|---|---|---|
| f | 16.463 | 16.070 |
| FNo. | 1.83 | 1.96 |
| 2ω (°) | 38.4 | 37.6 |
| DD [7] | 8.000 | 5.479 |
| DD [17] | 5.000 | 7.521 |

Table 10 shows the focal length f1 of the first lens group G1, the focal length f2 of the second lens group G2, and values corresponding to the conditional expression (1) to (11), for the imaging lenses of Examples 1 to 4. The values shown in Table 10 are based on the d-line.

TABLE 10

| EXPRESSION NUMBER | CONDITIONAL EXPRESSION | EXAMPLE 1 | EXAMPLE 2 | EXAMPLE 3 | EXAMPLE 4 |
|---|---|---|---|---|---|
| | f1 | −84.602 | 83.691 | 91.495 | 70.328 |
| | f2 | 17.453 | 24.055 | 23.968 | 24.166 |
| (1) | v1 | 31.31 | 22.73 | 22.73 | 19.32 |
| (2) | v1 − vY | 1.47 | −2.73 | −2.73 | −6.14 |
| (3) | vZ − vY | 26.03 | 15.32 | 3.68 | 14.68 |
| (4) | f2/RYf | −2.817 | −2.970 | −2.959 | −2.983 |
| (5) | f/f2 | 0.688 | 0.684 | 0.678 | 0.681 |
| (6) | f2/f1 | −0.206 | 0.287 | 0.262 | 0.344 |
| (7) | (RXf − RWr)/(RXf + RWr) | 1.000 | 0.740 | 0.722 | 0.719 |
| (8) | dWX/f2 | 0.060 | 0.075 | 0.075 | 0.074 |
| (9) | f2/RWr | 1.391 | 2.555 | 2.361 | 2.352 |
| (10) | RWr/RYf | −2.025 | −1.162 | −1.253 | −1.268 |
| (11) | f2/f21 | 1.376 | 1.203 | 1.398 | 1.022 |

As can be seen from the above-mentioned data, the imaging lenses of Examples 1 to 4 each have a small F number which is within a range of 1.80 to 2.0 in a state where the infinite distance object is in focus, have nine lenses constituting the whole system, and have small fluctuation in aberrations caused by focusing, and each of aberrations including lateral chromatic aberration is satisfactorily corrected, thereby achieving high optical performance.

Figure 9:
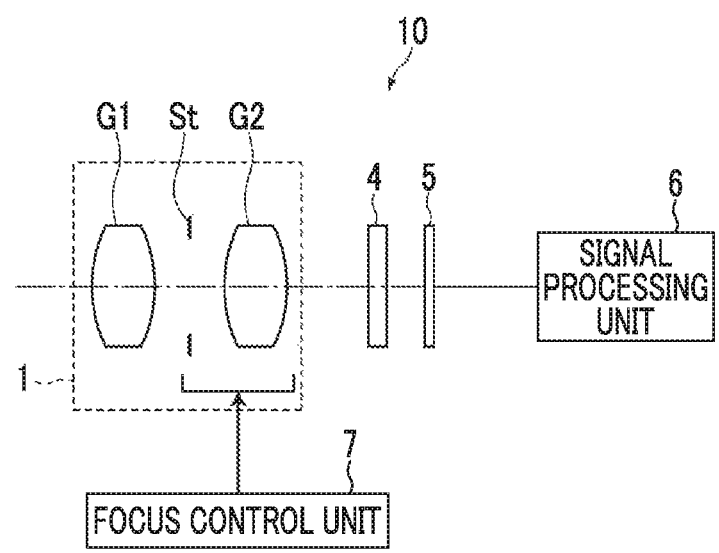
FIG. 9 is a schematic configuration diagram of an imaging apparatus according to an embodiment of the present invention.

Next, an imaging apparatus according to embodiment of the present invention will be described. FIG. 9 is a schematic configuration diagram of an imaging apparatus 10 using the imaging lens 1 according to the embodiment of the present invention as an example of an imaging apparatus of an embodiment of the present invention. As the imaging apparatus 10, for example, there is an FA camera, a machine vision camera, or a surveillance camera.

The imaging apparatus 10 comprises: the imaging lens 1; a filter 4 that is disposed on the image side of the imaging lens 1; an imaging element 5; a signal processing unit 6 that performs processing of calculating a signal which is output from the imaging element 5, and a focus control unit 7 that is for performing focusing of the imaging lens 1. FIG. 9 schematically shows the first lens group G1, the aperture diaphragm St, and the second lens group G2 which are belonging to the imaging lens 1. In addition, FIG. 9 shows an example in which focusing is performed by integrally moving the second lens group G2 and the aperture diaphragm St through the focus control unit 7, but a focusing method of the imaging apparatus of the present invention is not limited to this example. The imaging element 5 captures an image of a subject, which is formed through the imaging lens 1, and converts the image into an electrical signal. For example, charge coupled device (CCD), complementary metal oxide semiconductor (CMOS), or the like may be used. The imaging element 5 is disposed such that the imaging surface thereof is coplanar with the image plane of the imaging lens 1. The imaging apparatus 10 of the present embodiment comprises the imaging lens 1. Thus, it is possible to appropriately cope with a change in object distance, and it is possible to acquire a favorable image.

The present invention has been hitherto described through embodiments and examples, but the present invention is not limited to the above-mentioned embodiments and examples, and may be modified into various forms. For example, values such as the radius of curvature, the surface spacing, the refractive index, the Abbe number, and the aspheric coefficient of each lens component are not limited to the values shown in the numerical examples, and different values may be used therefor.

For example, in each example, the lens system, which performs focusing from the infinite distance object to the close-range object, is used. However, it is needless to say that the present invention can be applied to an imaging lens which performs focusing from a long distance object at a finite distance to a close-range object.

The imaging apparatus according to the embodiment of the present invention is also not limited to the above-mentioned examples, but may include various embodiments such as a video camera, a digital camera, a film camera, and a cinema camera.

EXPLANATION OF REFERENCES

1: imaging lens
2: on-axis rays
3: off-axis rays with maximum angle of view
4: filter
5: imaging element
6: signal processing unit
7: focus control unit
10: imaging apparatus
G1: first lens group
G2: second lens group
L11 to L14, L21: lens
Lw: W lens
Lx: X lens
Ly: Y lens
Lz: Z lens
PP: optical member
Sim: image plane
St: aperture diaphragm
Z: optical axis

What is claimed is:

1. An imaging lens consisting of, in order from an object side:
a first lens group that remains stationary with respect to an image plane during focusing;
a diaphragm; and
a second lens group that moves from an image side to the object side during focusing from a long distance object to a close-range object and has a positive refractive power as a whole,
wherein the first lens group consists of, in order from the object side, a negative meniscus lens that has an absolute value of a radius of curvature of an image side surface smaller than an absolute value of a radius of curvature of an object side surface, a negative lens, a positive lens, and a negative lens,
wherein the second lens group consists of five or less lenses,
wherein the second lens group includes a Z lens that is a positive lens formed continuously in order from a most image side, a Y lens that is a negative lens having an absolute value of a radius of curvature of an object side surface smaller than an absolute value of a radius of curvature of an image side surface, an X lens that is a positive lens, and
wherein the following conditional expressions (1) and (2) are satisfied, $$15 < v1 < 35 \quad (1), \text{ and}$$

$$-15 < v1 - vY < 10 \quad (2),$$

where v1 is an Abbe number of the negative meniscus lens of the first lens group based on a d-line, and vY is an Abbe number of the Y lens based on a d-line.

2. The imaging lens according to claim 1,
wherein among partial dispersion ratios of the lenses of the first lens group at a g-line and an F-line, a partial dispersion ratio of the lens closest to the object side in the first lens group is at a maximum, and
wherein among Abbe numbers of the lenses of the first lens group based on the d-line, an Abbe number of the second lens from the object side in the first lens group is at a maximum.

3. The imaging lens according to claim 1, wherein the following conditional expression (3) is satisfied, $$2.5 < vZ - vY < 40 \quad (3),$$

where vZ is an Abbe number of the Z lens based on a d-line.

4. The imaging lens according to claim 1, wherein the following conditional expression (4) is satisfied, $$-4 < f2/RYf < -1 \quad (4),$$

where f2 is a focal length of the second lens group, and RYf is the radius of curvature of the object side surface of the Y lens.

5. The imaging lens according to claim 1, wherein the following conditional expression (5) is satisfied, $$0.4 < f/f2 < 1 \quad (5),$$

where f is a focal length of the whole system in a state where an infinite distance object is in focus, and f2 is a focal length of the second lens group.

6. The imaging lens according to claim 1, wherein the following conditional expression (6) is satisfied, $$-0.55 < f2/f1 < 0.5 \quad (6),$$

where f2 is a focal length of the second lens group, and f1 is a focal length of the first lens group.

7. The imaging lens according to claim 1, wherein the following conditional expression (1-1) is satisfied $$17 < v1 < 28 \quad (1-1).$$

8. The imaging lens according to claim 1, wherein the following conditional expression (2-1) is satisfied $$-10 < v1 - vY < 0 \quad (2-1).$$

9. The imaging lens according to claim 1, wherein the following conditional expression (3-1) is satisfied, $$3 < vZ - vY < 35 \quad (3-1),$$

where vZ is an Abbe number of the Z lens based on a d-line.

10. The imaging lens according to claim 1, wherein the following conditional expression (4-1) is satisfied.

$$-3.5 < f2/RYf < -1.5 \quad (4-1),$$

where f2 is a focal length of the second lens group, and RYf is the radius of curvature of the object side surface of the Y lens.

11. The imaging lens according to claim 1, wherein the following conditional expression (5-1) is satisfied, $$0.45 < f/f2 < 0.8 \quad (5-1),$$

where f is a focal length of the whole system in a state where an infinite distance object is in focus, and f2 is a focal length of the second lens group.

12. The imaging lens according to claim 1, wherein the following conditional expression (6-1) is satisfied, $$-0.5 < f2/f1 < 0.4 \quad (6-1),$$

where f2 is a focal length of the second lens group, and f1 is a focal length of the first lens group.

13. The imaging lens according to claim 1,
wherein the second lens group includes a W lens that is a negative lens which is formed continuously up to the X lens on the object side of the X lens and which has an absolute value of a radius of curvature of an image side surface smaller than an absolute value of a radius of curvature of an object side surface, and
wherein the following conditional expression (7) is satisfied, $$0.1 < (RXf - RWr)/(RXf + RWr) < 3 \quad (7)$$

where RXf is a radius of curvature of an object side surface of the X lens, and

RWr is the radius of curvature of the image side surface of the W lens.

14. The imaging lens according to claim 1, wherein the second lens group consists of, in order from the object side, a positive lens, a negative lens, the X lens, the Y lens, the Z lens.

15. The imaging lens according to claim 1, wherein the diaphragm and the second lens group integrally move during focusing.

16. The imaging lens according to claim 13, wherein the following conditional expression (8) is satisfied, $$0.01 < dWX/f2 < 0.2 \tag{8}$$

where dWX is an on-axis spacing between the image side surface of the W lens and the object side surface of the X lens, and f2 is a focal length of the second lens group.

17. The imaging lens according to claim 13, wherein the following conditional expression (9) is satisfied, $$0.5 < f2/RWr < 4 \tag{9}$$

where f2 is a focal length of the second lens group, and
RWr is the radius of curvature of the image side surface of the W lens.

18. The imaging lens according to claim 13, wherein the following conditional expression (10) is satisfied, $$-3 < RWr/RYf < -0.5 \tag{10}$$

where RWr is the radius of curvature of the image side surface of the W lens, and
RYf is the radius of curvature of the object side surface of the Y lens.

19. The imaging lens according to claim 14, wherein the following conditional expression (11) is satisfied, $$0.75 < f2/f21 < 2 \tag{11}$$

where f2 is a focal length of the second lens group, and
f21 is a focal length of the positive lens closest to the object side in the second lens group.

20. An imaging apparatus comprising the imaging lens according to claim 1.

* * * * *